Sept. 17, 1968  W. F. JANEWAY  3,402,298
OPTICAL-ELECTRONIC DISPLACEMENT TRANSDUCER
Filed Oct. 6, 1964  2 Sheets-Sheet 2
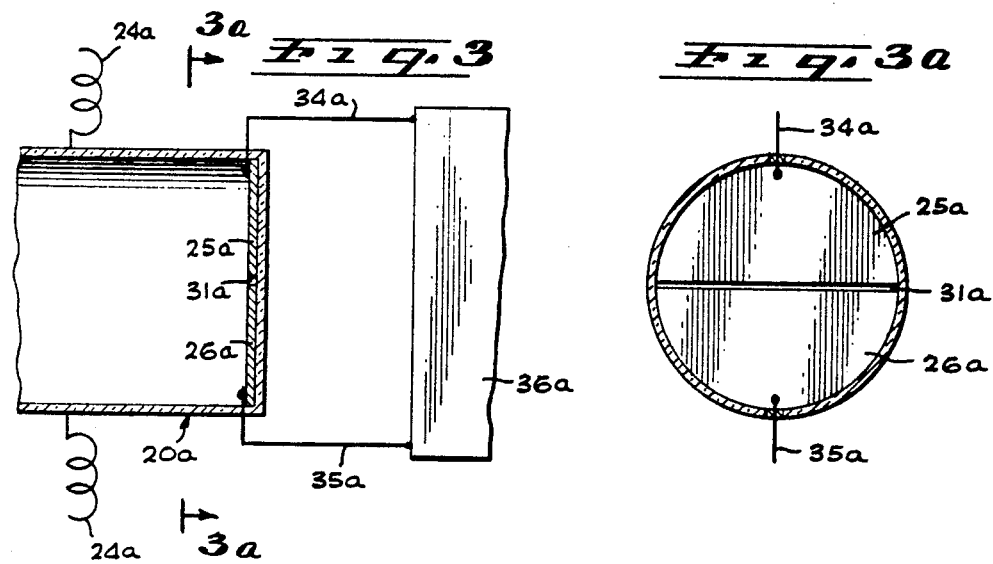
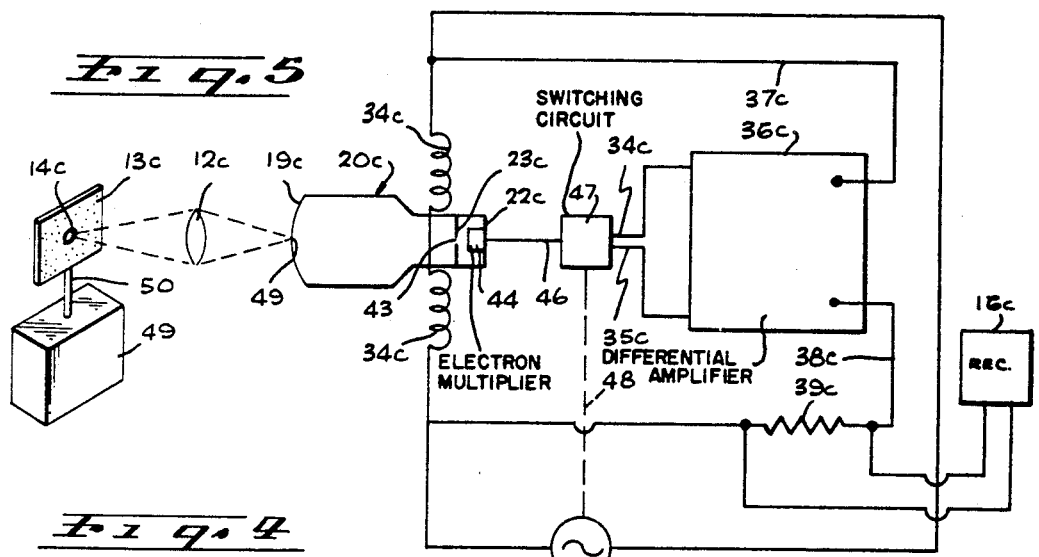
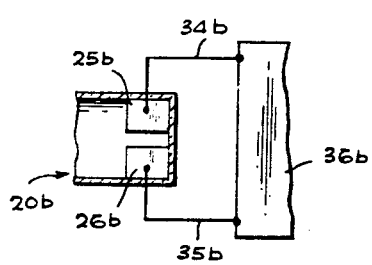
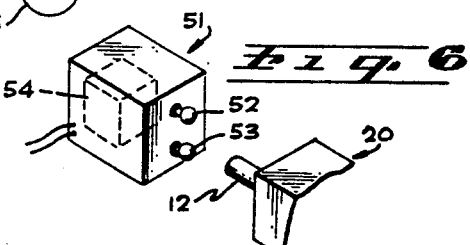
INVENTOR.
WILLIAM F. JANEWAY
BY
William P. Green
ATTORNEY

United States Patent Office 3,402,298
Patented Sept. 17, 1968

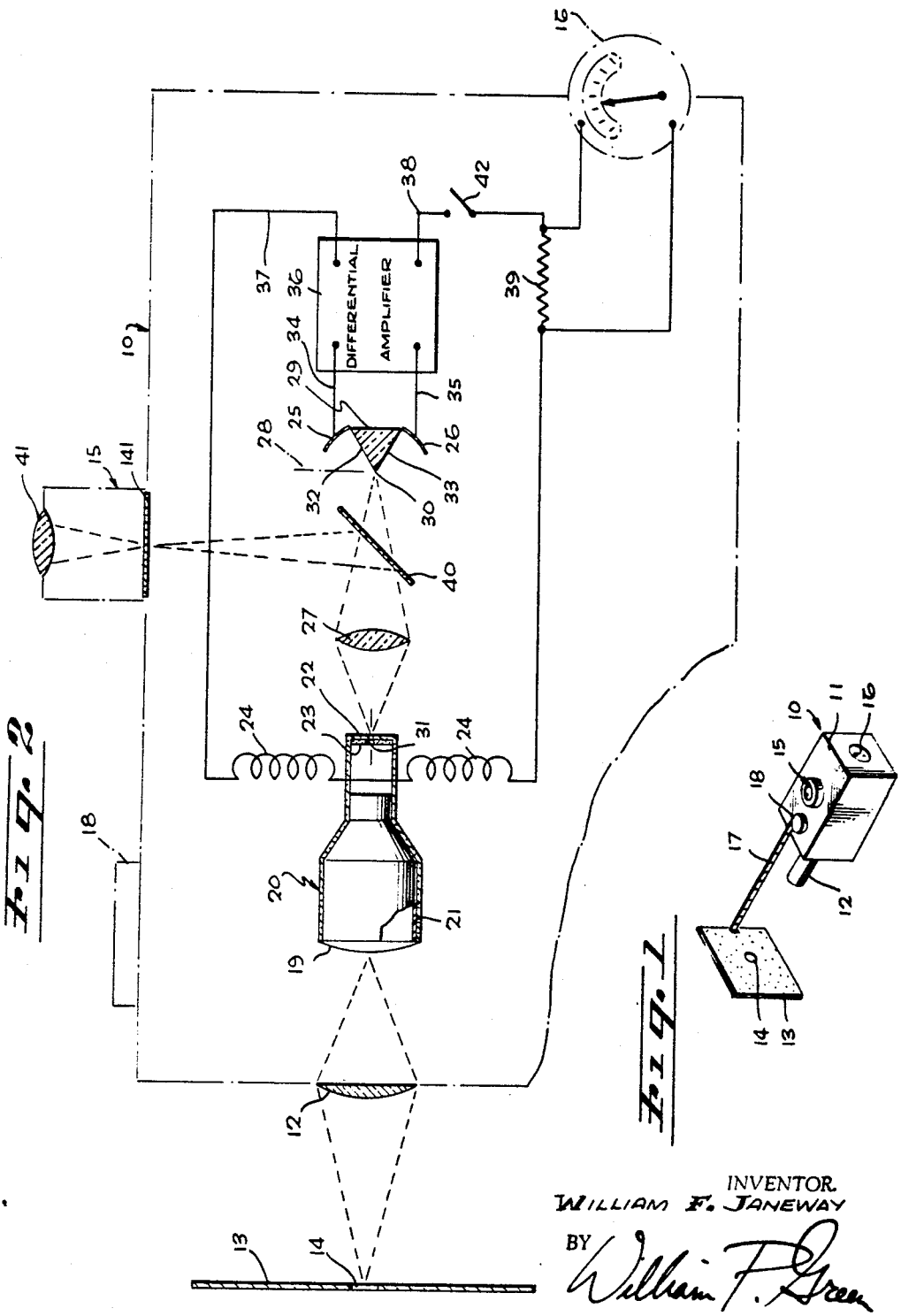

3,402,298
OPTICAL-ELECTRONIC DISPLACEMENT
TRANSDUCER
William F. Janeway, 2945 Glen Albin,
Santa Barbara, Calif. 93105
Filed Oct. 6, 1964, Ser. No. 401,818
22 Claims. (Cl. 250—203)

ABSTRACT OF THE DISCLOSURE

An optical-electronic displacement transducer, for viewing an object optically, and then producing an electrical signal varying in accordance with movement of the object. The transducer includes a tube on which an optical image of the target area is produced, and which acts to produce a corresponding electron image, in conjunction with means responsive to the electron image to produce two electrical signals varying in accordance with changes in illumination of two different portions of the input face of the tube. These two signals are combined to produce a signal varying in accordance with the difference between them, and the combined signal is then utilized to deflect the electron image in a manner compensating for the movement of an object in the target area.

---

This invention relates to improved optical-electronic transducer devices for tracking, observing and measuring displacement of a moving object. Devices embodying the invention preferably view the moving object (or an apparently moving object) optically, and then function to produce an electrical signal varying in accordance with and representing displacement of the target object.

There have in the past been proposed certain types of optical-electronic transducer structures, which have been intended for use primarily in instances in which advantages may be attained by avoiding contact of any type with the target object being studied, as is possible when motion of the object is responded to optically rather than by any type of mechanical connection to the object. When such an optical pick-up is employed, the motion responsive apparatus introduces no mechanical resistance to movement of the target, can respond to much more rapid motion than where mechanical actuation is necessary, and at the same time can respond to very small or slow movements which can be rendered easily observable by suitable optical magnification systems or the like. In addition, an optical pick-up unit may be placed at a considerable distance from the moving object, as for example at the outside of a furnace or other inaccessible chamber, and typically viewing the moving target through a window or viewing aperture.

In spite of the rather clear and obvious advantages of using a transducer having an optical pick-up system, the prior optical-electronic transducer structures with which I am familiar have had such decided operational inadequacies as to render them impractical for use in many of the situations in which optical response would otherwise be advantageous, and consequently these prior devices have not been used as widely as would be desired.

One extremely significant disadvantage of prior optical-electronic displacement transducers has been their inability to effectively sense motion of anything other than a particular edge of a target object, or an edge of a portion of such an object. By virtue of the design of these devices to thus function as edge following units, they have been inherently unstable in operation, and have tended, when conditions have become very slightly abnormal, to sweep entirely past and beyond the target edge, and to then be incapable of recovering the target until manually reset to a position of alignment with the target edge. Edge following units are additionally very sensitive to slight changes in intensity of the total illumination of the target, and may quickly lose a proper following alignment with the target edge if the light level changes appreciably. Also, an edge following unit can not initially set itself to properly track a target which may at the outset be within the field of view of the unit but not centered therein. Instead, such a device must be initially preset very precisely in a properly centered relation with respect to the target edge before any results whatever can be attained.

With the above and other disadvantages of prior transducers in mind, a major object of the present invention is to provide an optical-electronic displacement transducer which is completely stable when set on a target, and which will not lose the target as a result of changes in light intensity or any of the other conditions which may cause such loss of target in other optical transducers. Additionally, a device embodying the invention is so constructed that it may automatically acquire a target which is initially in an off-center non-tracking position relative to the system. As a result, even if the target is temporarily lost for some reason, as by jarring of the viewing equipment, temporary loss of power, or the like, the apparatus will itself immediately reacquire the target without any necessity for manual or other resetting.

These advantages are attained in large part by construction of my apparatus to function as a spot tracking device, rather than an edge tracking device. An image of the spot is formed on an electronic tube, which serves to form internally, within the tube, an electron image corresponding to the optical image on the input screen of the tube. The electron image is employed to form two electrical signals corresponding in intensity to the illumination of two different portions of the optical image area on the input screen of the tube. A combined signal is then formed varying in accordance with the difference between the two previously mentioned signals, and this combined signal is utilized to deflect the electron image within the tube in a manner compensating for movements of the target spot (or spots) and its optical image on the input screen, so that movement of the target does not cause corresponding movement of the electron image. The intensity of the compensating deflection signal then represents electrically the motion of the target, and can be read out as an indication of that motion.

In one form of the invention, the tube is an image converter tube of known construction, whereas in another form a conventional image dissector tube is utilized. In still other forms of the invention, similar but slightly altered transducer tubes are employed.

While the present invention has been referred to primarily as a spot following unit, and will be described primarily as functioning to follow a spot, it will be apparent from the following description that the target may in actuality take any of numerous different shapes or forms.

The above and other features and objects of the invention will be better understood from the following detailed description of the typical embodiments illustrated in the accompanying drawings, in which:

FIG. 1 is a perspective view representing a first form of optical-electronic displacement transducer constructed in accordance with the invention;

FIG. 2 represents schematically or diagrammatically the optical and electrical systems of the FIG. 1 device;

FIG. 3 is an enlarged fragmentary view of a variational type of tube which may be used;

FIG. 3a is a section on line 3a—3a of FIG. 3;

FIG. 4 is a view similar to FIG. 3, but showing still another form of the invention;

FIG. 5 is a view similar to FIG. 2, but showing another form of the invention, and a first type of calibrator for the transducer; and FIG. 6 shows a second type of calibrator.

Referring first to FIG. 1, I have represented somewhat diagrammatically at 10 in that figure a portable optical-electronic displacement transducer unit constructed in accordance with the invention. This unit may be considered as having a housing 11 carrying at one end an optical lens structure 12 directed toward a target 13, which may typically be considered as a movable item or surface which is colored black except at the location of a small central white spot 14. Spot 14 is normally centered within the field of view of the lens assembly 12. Target 13 may, as an example, be a piece of equipment which is vibrating while in operation, so that the spot 14 reciprocates or oscillates in accordance with the vibrations, and these vibratory movements of the spot are to be followed by transducer unit 10. A viewing unit 15 may be provided on housing 11, for enabling a user to view an image formed within the housing and representing movements of the spot 14. An indicator 16 of any conventional type may be mounted on a wall of the unit 10, or elsewhere, to function as a readout element producing either a momentary indication or permanent record of the movements of spot 14. For example, indicator 16 may be a galvanometer calibrated to indicate directly, by movements of the galvanometer pointer, the extent to which spot 14 has moved from an initial centered location; or element 16 may be a frequency meter indicating the frequency of reciprocating motion of spot 14; or unit 16 may be a recorder for forming a graph or other permanent record of the above or other characteristics of the motion of spot 14. Unit 10 is also illustrated in FIG. 1 as having a flexible tape-measure 17 mounted thereto, and adapted to be coiled within a tape-measure housing 18 carried by main housing 11, and to extend outwardly to the target 13 to indicate the distance of the target from the transducer device.

With reference now to the schematic showing of FIG. 2, the lens assembly 12 is illustrated diagrammatically in that figure, and acts to focus an image (usually inverted) of the target area 13 on an input face 19 of a conventional image converter tube 20. Desirably lens assembly 12 is adjustably focusable, to focus on face 19 an image of a target at any desired target distance within a predetermined range. Thus the instrument is not required to be at a particular predetermined distance from the target, as would be the case if a fixed focus lens were used.

The image of light spot 14 on target 13 may occupy only a small central portion of the face 19 of tube 20, with the rest of that face having a darker image corresponding to the surrounding dark area of target 13. Face 19 of the tube forms a light sensitive photocathode, which emits electrons at each point across its area in accordance with the amount of light falling on that point. The electrons thus emitted from photocathode face 19 are focused by an electron lens structure, including a grid 21 in the tube, to form an electron image at the opposite transverse end 22 of the tube 20. In this electron image, the number of electrons impinging on a particular portion of the image area corresponds to the amount of light falling on the corresponding point on input face 19, so that the electron image is an accurate point-to-point reproduction (inverted) of the visible image on face 19. On the inner surface of the transparent end wall 22 of tube 20, there is provided a fluorescent screen or coating 23, desirably formed of "fast" phosphors such as those referred to as P15 and P16, for producing a visible image at end 22 corresponding to the electron image.

The electron image and resulting visible image at face 22, may be deflected upwardly or downwardly within the tube, and relative to face 22, by energization of two conventional deflection coils 24, forming a yoke applied to the outside of the tube. It is also contemplated that deflection plates may be substituted for coils 24, if electrostatic rather than electromagnetic deflection is desirable in a particular installation.

Image converter tubes of this type are conventional and well known in the art, and consequently no further effort will be made to describe in detail the construction or operation of the tube. As a typical showing of an image converter tube in a patent, reference is made to Patent No. 2,179,083, issued to E. Bruche et al. Nov. 7, 1939 on "Electron Image Tube."

The visible image produced on fluorescent screen 23 of tube 20 is divided into two portions, with the light from one of these portions (typically the lower half of screen 22 as viewed in FIG. 2) being directed on a first light responsive element or plate 25; and with light from the other portion of the screen (the upper half of the screen 22–23 in FIG. 2) being directed on the second light responsive plate 26. To thus direct the light from the two halves of the fluorescent screen, I may utilize a lens 27, acting to form a typically inverted image of screen 23 in the plane 28 of FIG. 2, with a wedge shaped mirror structure 29 being positioned to have its apex or edge 30 in horizontally extending position at the center of the image formed in plane 28 (corresponding to the horizontal center line 31 of screen 23). Wedge 29 has an upper inclined specularly reflective mirror surface 32 which acts to reflect all light above the line 30 upwardly onto light responsive plate 25, while a lower specularly reflective mirror surface 33 similarly reflects light from the lower half of the image in plane 28 downwardly onto plate 26.

The two plates 25 and 26 are photoelectric detectors, which act to produce two electrical signals in lines 34 and 35 varying in intensity of the total electron currents arriving at the upper end lower halves respectively of fluorescent screen 23 of tube 20. These two currents are fed into a differential amplifier 36, in opposition to one another, so that the amplifier produces in output lines 37 and 38 an amplified current varying in accordance with, and in proportion to, variations in the difference between the two signals fed to the differential amplifier from plates 25 and 26. This output from the amplifier passes through deflection coils 24 in a direction to cause deflection or displacement of the electron image within tube 20 in a direction and amount compensating for whatever change in position of the image on screen 23 may have initially caused the difference between the outputs from the two photoelectric plates 25 and 26. The feedback deflection signal thus delivered to deflection coils 24 passes through a resistor 39, across which the meter, recorder, or other readout unit 40 is connected, to thus produce an indication varying in correspondence with variations in the deflection signal.

The previously mentioned viewing unit 15 may be provided at a convenient location on the unit 10, to enable a user to directly view fluorescent screen 23 at any time. This viewing system 15 may include a semi-reflective mirror 40, adapted to pass a desired portion of the light from screen 23 onto plates 25 and 26 (say about one-half of that light), and adapted to reflect upwardly to a viewing lens 41 the rest of that light. The user may then look downwardly through lens 41 to see the image on screen 23. A disabling switch 42 may be connected into the output circuit of amplifier 36, to temporarily cut-out all deflecting current within coils 24, so that the electron produced image on screen 23 may move temporarily to a position corresponding exactly to the position of the image of area 14 on input face 19 of tube 20, to enable the viewer, looking through unit 15, to visually see that displacement. A ruled transparent plate or reticle 141 typically carrying scale markings for indicating dimensions, may be provided in the image plane of the viewing unit 15, to enable visual measurement of the displacement of the viewed spot image.

To now describe the manner of use of the equipment of FIGS. 1 and 2, assume that the unit 10 is positioned as illustrated in FIG. 1, and that the image of lighted area or spot 14 on face 19 is initially located at exactly the center of that face. In this condition, with no defletcing current present in coils 24, tube 20 functions to produce an electron image and a resulting fluorescently visible image on screen 23 which corresponds exactly to the visible image on face 19, with the image of light spot 14 being initially located at exactly the center of screen 23. As a result, the lens 27 and reflectors 32 and 33 direct exactly one-half of the light from the central lighted area of screen 23 (the image of spot 14) onto photoelectric element 25, while the other or lower half of that light is directed onto element 26. The outputs from photoelectric plates 25 and 26 are therefore exactly balanced, so that no output is produced in lines 37 and 38 leading to the deflection coils.

If now target 13 and its white area 14 move upwardly a short distance, this causes corresponding downward movement of the image of spot 14 on face 19, and tends to cause similar upward movement of the electron image and visible image at screen 23. However, when the visible image on screen 23 does move very slightly upwardly, the amount of light falling on plate 26 increases, and the amount of light falling on plate 25 decreases, so that the signal in line 35 becomes greater than the electrical signal in line 34, and the differential amplifier 36 therefore produces an output current in deflection coils 24. This current deflects the electron image downwardly just sufficiently to compensate for the slight upward movement of the target spot 14, and to maintain the lighted spot on screen 23 at exactly its center. Similarly, downward movement of spot 14 causes a reverse actuation of differential amplifier 36 and the deflection coils, to produce an upward deflecting magnetic field bringing the image of the spot on screen 23 upwardly to the properly centered position. Thus, regardless of the movements of spot 14, its image on screen 23 always remains centered on that screen, and the feedback current fed to deflection coils 24, and which is exactly the amount of current required at any particular instant to compensate for movement of target spot 14, is always proportional to the amount of displacement of spot 14 from an initial centered position. The galvanometer or other indicating instrument 16 responds to and in effect indicates the amount of current fed to deflection coils 24, and thus its pointer provides a direct indication of the displacement in either of two opposite directions (upwardly or downwardly) of spot 14.

FIGS. 3 and 3a illustrate fragmentarily an arrangement which may be considered the same as that of FIGS. 1 and 2, except for the illustrated alteration in tube 20a, and the resultant elimination of some of the optical equipment between that tube and the differential amplifier 36a. In FIGS. 3 and 3a, the fluorescent screen 23 of FIG. 2 has been omitted, and in its place there have been substituted two complementary electrically conductive transverse plates 25a and 26a, which occupy substantially the entire cross section of the inner face of end wall 22a of the tube, and which are insulated from one another along a narrow horizontal line 31a dividing the upper half of the tube from the lower half. An electron image such as that falling on fluorescent screen 23 of FIG. 2, falls directly on the two plates 25a and 26a of FIG. 3, with the upper half of the image being on plate 25a and the lower half being on plate 26a, and the electrons of this image cause currents to flow through lines 34a and 35a to differential amplifier 36a. These currents constitute signals corresponding to the two signals fed to the differential amplifier 36 of FIG. 2, which signals produce an output which is fed back to the deflection coils 24a in the same manner previously discussed. The reading out of this composite or combined deflection signal is effected as discussed previously, and the electron image is deflected in the same manner as in FIG. 2 to always remain at the center of the rear face of the tube, one-half on plate 25a and the other half on plate 26a, regardless of the movements of the target spot.

It is also contemplated that the fluorescent screen 23 of FIG. 2 may itself function as the plates 25a and 26a of FIG. 3, with an appropriate insulative separation at 31a. Fluorescent screens are normally made conductive, as required for FIG. 3, in order to bleed off the electrons. If plates 25a and 26a are fluorescent, they may be viewed optically by a viewer such as that shown at 15 in FIG. 2.

FIG. 4 shows another form of the invention which may be considered as the same as that of FIG. 3 except that there ar substituted for the two plates 25a and 26a a pair of electron multipliers represented diagrammatically at 25b and 26b, which receive and respond to electrons in the upper half and lower half respectively of the electron image in tube 20b, to produce electrical signals in lines 34b and 35b respectively leading to differential amplifier 36b. The operation of the rest of the apparatus is the same as in FIG. 1 and 2.

FIG. 5 shows another form of the invention which utilizes a conventional image dissector tube 20c, instead of the image converter tube of FIG. 2. This image dissector tubes has a photocathode or input face 19c onto which an image of the target 13a and its light colored central area 14c are focused by lens assembly 12c. As in FIG. 2, tube 20c forms an electron image, which in FIG. 5 is focused by an electron lens arrangement on a conductive plate 23c formed near the end 22c of tube 20c. This conductive plate 23c is imperforate, and intercepts the electrons of the electron image, except at the location of a small central aperture 43, through which the electrons forming a very localized portion of the electron image may pass to the right to an electron multiplier represented diagrammatically at 44. Deflection coils 34c are continuously energized by a source of alternating current represented diagrammatically at 45, to continuously cause the electron image to scan upwardly and downwardly across conductive plate 23c, so that in effect the aperture 43 scans the electron image within tube 20c. That is, the electrons passing through aperture 43 at a particular initial instant may be considered as those representing the uppermost portion of the visible image on screen 19c, immediately following which the electrons passing through aperture 43 represents a next lower portion of the visible image on face 19c, and so forth until the entire image has been scanned and the electrons passing through aperture 43 represent the lowermost portion of the visible image on face 19c. After thus scanning downwardly across the image, the aperture 43 scans upwardly in the same manner, and so forth repeatedly and at a frequency dependent upon the frequency of alternating current power source 45.

The electron multiplier 44 produces an output signal in a line 46 which varies in correspondence with variations in the number of electrons passing through aperture 43. This signal is passed through a switching circuit 47, which is controlled by and timed with respect to the alternations of power source 45, as indicated by the broken line 48 of FIG. 5. The switching circuit in effect divides the signal in line 46 into two separate halves constituting two signals in lines 34c and 35c respectively leading to differential amplifier 36c. Circuit 47 passes the output from electron multiplier 44 to line 34c whenever the electrons passing through aperture 43 represent some portion of the input face 19c above its center line 49. At the instant that the scanning operation previously discussed reaches a point at which the electrons passing through aperture 43 are at the center of the electron image corresponding to center line 49, switching circuit 47 changes condition to pass the output from electron multiplier 44 into line 35c, as aperture 43 scans downwardly across the center line to receive electrons representing portions of the visible image beneath center line 49 of face 19c. Similarly, during an upward sweep of aperture 43 across the electron image, switching circuit 47 changes from line 35c to line 34c as soon as aperture 43 commences to pass electrons which represent the upper half of the visible image on face 19c. Switching circuits for performing a function such as that required of circuit 47 in FIG. 5 are well known in the art, and are referred to as synchronous demodulators.

In view of this switching function, the signals in lines 34c and 35c correspond very closely to the signals in lines 34 and 35 of FIG. 2, and may be treated the same by differential amplifier 36c to produce a combined differential signal in lines 37c and 38c which may be fed back to deflection coils 34c (or a second set of deflection coils or plates if preferred), to exactly compensate for any upward or downward movement of the mean position of the vertically scanning electron image within tube 20c, which movement of the electron image results from upward or downward displacement of target spot 14c. Thus, the compensating signal within lines 37c and 38c maintains the mean position of the vertically oscillating electron image at a centered position on plate 23c, regardless of the upward and downward displacement of target 13c, so that a recorder or other readout element 16c, typically connected across a resistor 39c, may produce an indication of the compensating current fed to the deflection coils, and therefore an accurate indication or recording of the displacement of target 13c.

In FIG. 5, the target has been illustrated typically as being carried by or forming a portion of a special calibrating instrument 49, which may take the form of a vibrator or mechanical oscillator having a vibrating upwardly projecting carrier 50 to which the target 13c is mounted. The vibrator may be set to oscillate at a predetermined frequency, or may be adjustable to vibrate at different frequencies, or to displace the spot 14c different predetermined measurable amounts (different displacement amplitudes). This calibrator may be utilized to calibrate recorder 16c for a proper indication of the frequency or extent of displacement of the target, or to otherwise test the equipment.

FIG. 6 shows another type of calibrator 51, which may have two electric lights 52 and 53 both within the field of vision of the lens system 12 of the unit 20 of FIG. 1, and with the device 51 containing an oscillator 54 acting to alternately energize the two lights 52 and 53, to thereby produce an apparent motion of the lighted area within the field of vision of lens system 12, to calibrate and test response of unit 20 to such apparent motion of the lighted area.

In all of the described forms of the invention, the discussed differential or two signal type of response to movements of the target result in maximum stability of the target following system, and maximum capacity to remain on target and to avoid loss of the target regardless of variations in conditions which might adversely affect other systems. Further, even if the target spot 14 of FIG. 1, or the corresponding target area of any of the other forms of the invention, is initially in a non-centered position, in which its image on the photocathode 19 or its equivalent is not centered, the apparatus will still function, and will in fact respond to the unequal distribution of light in the two halves of the target area in a manner moving the electron image within the tube to a properly centered position at which a null condition is attained. Thus, the system can automatically acquire a target which is not initially centered, or can recover a target which may be temporarily lost, a feature of great practical importance in this art.

The system will of course also work if the central area 14 of FIG. 1 is a dark area, and the background is a light area, or if there is employed any other pattern of light and dark areas which is adapted to produce a balanced output on the two photoelectric pick-up plates 25 and 26, or their equivalent, in only one position of the electron image. However, for following a dark spot, a reversal of phase is necessary, i.e. the connections represented by leads 34 and 35 or leads 37 and 38 of FIG. 2, or the corresponding leads of other forms of the invention, must be reversed.

While I have typically illustrated certain embodiments of my invention, it is to be understood that the invention is not limited to these specific arrangements, but rather is applicable broadly to any apparatus falling within the scope of the appended claims.

I claim:

1. An optical-electronic displacement transducer comprising a tube which has an input face onto which an optical image may be focused and which is adapted to form a corresponding electron image, means for forming on said input face of the tube an optical image of a target area, means responsive to said electron image to produce two electrical signals varying in accordance with changes in illumination of two different portions respectively of said input face, means for producing a combined signal varying in accordance with the difference between said two signals, and deflection means controlled by said combined signal for deflecting said electron image in accordance with variations in said combined signal and to an extent and in a direction to compensate for motion of an object in said target area.

2. An optical-electronic displacement transducer comprising a tube which has an input face onto which an optical image may be focused and which is adapted to form a corresponding electron image, means for forming on said input face of the tube an optical image of a target area, means responsive to said electron image to produce two electrical signals varying in accordance with changes in illumination of two different portions respectively of said input face, means for producing a combined signal varying in accordance with the difference between said two signals, deflection means controlled by said combined signal for deflecting said electron image in accordance with variations in said combined signal and to an extent and in a direction to compensate for motion of an object in said target area, and a readout unit actuated by said combined signal for producing an indication representing the movements of said object.

3. An optical-electronic displacement transducer comprising a tube which has an input face onto which an optical image may be focused and which is adapted to form a corresponding electron image, means for forming on said input face of the tube an optical image of a target area, means responsive to said electron image to produce two electrical signals varying in accordance with changes in illumination of two different portions respectively of said input face, a differential amplifier for producing a combined signal varying in accordance with the difference between said two signals, and deflection means controlled by said combined signal for deflecting said electron image in accordance with variations in said combined signal and to an extent and in a direction to compensate for motion of an object in said target area.

4. An optical-electronic displacement transducer comprising a tube which has an input face onto which an optical image may be focused and which is adapted to form a corresponding electron image, means for forming on said input face of the tube an optical image of a target area, means responsive to said electron image to produce two electrical signals varying in accordance with changes in illumination of two different portions respectively of said input face, means for producing a combined signal varying in accordance with the difference between said two signals, and a deflection yoke carried by said tube and controlled by said combined signal for deflecting said electron image in accordance with variations in said combined signal and to an extent and in a direction to compensate for motion of an object in said target area.

5. An optical-electronic displacement transducer comprising a tube which has an input face onto which an optical image may be focused and which is adapted to form a corresponding electron image, a lens system at the outside of the tube for forming on said input face of the tube an optical image of a target area, means responsive to said electron image to produce two electrical signals varying in accordance with changes in illumination of two different portions respectively of said input face, means for producing a combined signal varying in accordance with the difference between said two signals, and deflection means controlled by said combined signal for deflecting said electron image in accordance with variations in said combined signal and to an extent and in a direction to compensate for motion of an object in said target area.

6. An optical-electronic displacement transducer comprising a tube which has an input face onto which an optical image may be focused and which is adapted to form a corresponding electron image, means for forming on said input face of the tube an optical image of a target area, means responsive to said electron image to produce two electrical signals varying in accordance with changes in illumination of two different portions respectively of said input face, means for producing a combined signal varying in accordance with the difference between said two signals, deflection means controlled by said combined signal for deflecting said electron image in accordance with variations in said combined signal and to an extent and in a direction to compensate for motion of an object in said target area, a resistance connected in series with said deflection means and through which said combined signal passes, and a readout indicating unit connected across said resistance to produce an indication dependent upon the current of said combined signal flowing through said resistance and thereby representing motion of said object.

7. An optical-electronic displacement transducer comprising a tube which has an input face onto which an optical image may be focused and which is adapted to form a corresponding electron image, a lens system at the outside of the tube for forming on said input face of the tube an optical image of a target area, means responsive to said electron image to produce two electrical signals varying in accordance with changes in illumination of two different portions respectively of said input face, a differential amplifier for producing a combined signal varying in accordance with the difference between said two signals, a deflection yoke carried by said tube and controlled by said combined signal for deflecting said electron image in accordance with variations in said combined signal and to an extent and in a direction to compensate for motion of an object in said target area, and a readout unit actuated by said combined signal for producing an indication representing the movements of said object.

8. An optical-electronic displacement transducer comprising an image converter tube which has an input face onto which an optical image may be focused and which is adapted to form a corresponding electron image, said tube having a fluorescent screen onto which said electron image is directed and acting to produce a corresponding visible output image, means for forming on said input face of the tube an optical image of a target area, means responsive to said visible output image to produce two electrical signals varying in accordance with changes in illumination of two different portions respectively of said input face, means for producing a combined signal varying in accordance with the difference between said two signals, and deflection means controlled by said combined signal for deflecting said electron image in accordance with variations in said combined signal and to an extent and in a direction to compensate for motion of an object in said target area.

9. A optical-electronic displacement transducer comprising an image converter tube which has an input face onto which an optical image may be focused and which is adapted to form a corresponding electron image, said tube having a fluorescent screen onto which said electron image is directed and acting to produce a corresponding visible output image, means for forming on said input face of the tube an optical image of a target area, two light sensitive elements positioned to receive light from two different portions respectively of said fluorescent screen and operable to produce two electrical signals varying in accordance with changes in illumination of two different portions respectively of said input face, means for producing a combined signal varying in accordance with the difference between said two signals, and deflection means controlled by seaid combined signal for deflecting said electron image in accordance with variations in said combined signal and to an extent and in a direction to compensate for motion of an object in said target area.

10. An optical-electronic displacement transducer comprising an image converter tube which has an input face onto which an optical image may be focused and which is adapted to form a corresponding electron image, said tube having a fluorescent screen onto which said electron image is directed and acting to produce a corresponding visible output image, means for forming on said input face of the tube an optical image of a target area, two light sensitive elements positioned to receive light from two different portions respectively of said fluorescent screen and operable to produce two electrical signals varying in accordance with changes in illumination of two different portions respectively of said input face, an optical system for directing light from said two portions respectively of the fluorescent screen onto said two light sensitive elements respectively, means for producing a combined signal varying in accordance with the difference between said two signals, and deflection means controlled by said combined signal for deflecting said electron image in accordance with variations in said combined signal and to an extent and in a direction to compensate for motion of an object in said target area.

11. An optical-electronic displacement transducer comprising an image converter tube which has an input face onto which an optical image may be focused and which is adapted to form a corresponding electron image, said tube having a fluorescent screen onto which said electron image is directed and acting to produce a corresponding visible output image, means for forming on said input face of the tube an optical image of a target area, two light sensitive elements positioned to receive light from two different portions respectively of said fluorescent screen and operable to produce two electrical signals varying in accordance with changes in illumination of two different portions respectively of said input face, said optical system including two mirror surfaces directed oppositely to reflect light from said two portions of the fluorescent screen onto said two light sensitive elements respectively and a lens system for directing light from said screen onto said mirror surfaces, means for producing a combined signal varying in accordance with the difference between said two signals, and deflection means controlled by said combined signal for deflecting said electron image in accordance with variations in said combined signal and to an extent and in a direction to compensate for motion of an object in said target area.

12. An optical-electric displacement transducer comprising an image converter tube which has an input face onto which an optical image may be focused and which is adapted to form a corresponding electron image, said tube having a fluorescent screen onto which said electron image is directed and acting to produce a corresponding visible output image, means for forming on said input face of the tube an optical image of a target area, two light sensitive elements positioned to receive light from two different portions respectively of said fluorescent screen and operable to produce two electrical signals varying in accordance with changes in illumination of two different portions respectively of said input face, an optical system for directing light from said two portions respectively of the fluorescent screen onto said two light sensitive elements respectively, there being a viewing system for intercepting some of the light from said optical system and producing a visible image of said screen, means for producing a combined signal varying in accordance with the difference between said two signals, and deflection means controlled by said combined signal for deflecting said electron image in accordance with variations in said combined signal and to an extent and in a direction to compensate for motion of an object in said target area.

13. An optical-electronic displacement transducer as recited in claim 12, in which said viewing system includes reference markings visible in conjunction with said image of the screen.

14. An optical-electronic displacement transducer comprising an image converter tube which has an input face onto which an optical image may be focused and which is adapted to form a corresponding electron image, said tube having a fluorescent screen onto which said electron image is directed and acting to produce a corresponding visible output image, an optical system for viewing said fluorescent screen, means for forming on said input face of the tube an optical image of a target area, means responsive to said visible output image to produce two electrical signals varying in accordance with changes in illumination of two different portions respectively of said input face, means for producing a combined signal varying in accordance with the difference between said two signals, and deflection means controlled by said combined signal for deflecting said electron image in accordance with variations in said combined signal and to an extent and in a direction to compensate for motion of an object in said target area.

15. An optical-electronic displacement transducer comprising an image converter tube which has an input face onto which an optical image may be focused and which is adapted to form a corresponding electron image, said tube having a fluorescent screen onto which said electron image is directed and acting to produce a corresponding visible output image, a lens system at the outside of the tube for forming on said input face of the tube an optical image of a target area, means responsive to said visible output image to produce two electrical signals varying in accordance with changes in illumination of two different portions respectively of said input face, a differential amplifier for producing a combined signal varying in accordance with the difference between said two signals, deflection means controlled by said combined signal for deflecting said electron image in accordance with variations in said combined signal and to an extent and in a direction to compensate for motion of an object in said target area, and a readout unit actuated by said combined signal for producing an indication representing the movements of said object.

16. An optical-electronic displacement transducer comprising a tube which has an input face onto which an optical image may be focused and which is adapted to form a corresponding electron image, means for forming on said input face of the tube an optical image of a target area, means forming two electrically conductive surfaces insulated from one another and positioned in the path of two different portions respectively of said electron image and operable to produce two electrical signals varying in accordance with changes in illumination of two different portions respectively of said input face, means for producing a combined signal varying in accordance with the differences between said two signals, and deflection means controlled by said combined signal for deflecting said electron image in accordance with variations in said combined signal and to an extent and in a direction to compensate for motion of an object in said target area.

17. An optical-electronic displacement transducer comprising a tube which has an input face onto which an optical image may be focused and which is adapted to form a corresponding electron image, means for forming on said input face of the tube an optical image of a target area, means comprising two electrically conductive surfaces in the tube insulated from one another and positioned in the path of two different closely proximate portions respectively of said electron image and operable to produce two electrical signals varying in accordance with changes in illumination of two different portions respectively of said input face, a differential amplifier for producing a combined signal varying in accordance with the differences between said two signals, deflection means controlled by said combined signal for deflecting said electron image in accordance with variations in said combined signal and to an extent and in a direction to compensate for motion of an object in said target area, and a readout unit actuated by said combined signal for producing an indication representing the movements of said object.

18. An optical-electronic displacement transducer comprising an image dissector tube which has an input face onto which an optical image may be focused and which is adapted to form a corresponding electron image, said tube having an output face forming a restricted aperture through which the electrons from only a small area of the electron image may pass and past which aperture the electron image is repeatedly scanned, means for forming on said input face of the tube an optical image of a target area, means responsive to said electron image to produce two electrical signals varying in accordance with changes in illumination of two different portions respectively of said input face, said signal producing means including means responsive to the electrons passing through said aperture to form a signal varying in accordance therewith, and switching means for dividing the output of said signal producing means into said two different signals with said two signals corresponding to the output of said signal producing means from two different portions respectively of the electron image being scanned past said aperture, means for producing a combined signal varying in accordance with the difference between said two signals, and deflection means controlled by said combined signal for deflecting said electron image in accordance with variations in said combined signal and to an extent and in a direction to compensate for motion of an object in said target area.

19. An optical-electronic displacement transducer comprising an image dissector tube which has an input face onto which an optical image may be focused and which is adapted to form a corresponding electron image, said tube having an output face forming a restricted aperture through which the electrons from only a small area of the electron image may pass and past which aperture the electron image is repeatedly scanned, means for supplying an alternating current controlling the repeated scanning of said electron image past said aperture, means for forming on said input face of the tube an optical image of a target area, means responsive to said electron image to produce two electrical signals varying in accordance with changes in illumination of two different portions respectively of said input face, said signal producing means including means responsive to the electrons passing through said aperture to form a signal varying in accordance therewith, and switching means operable in timed relation to the alternations of said alternating current and therefore to said scanning of the electron image for dividing the output of said signal producing means into said two different signals with said two signals corresponding to the output of said signal producing means from two different portions respectively of the electron image being scanned past said aperture, means for producing a combined signal varying in accordance with the difference between said two signals, and deflection means controlled by said combined signal for deflecting said electron image in accordance with variations in said combined signal and to an extent and in a direction to compensate for motion of an object in said target area.

20. The combination of claim 1 in which the optical image is produced by a calibrator having a target portion, said calibrator including means for producing controlled changes in the apparent position of said target portion.

21. The combination as recited in claim 20, in which said last mentioned means include means for oscillating said apparent position of the target at a controllably variable frequency.

22. The combination as recited in claim 20, in which said last mentioned means include means for oscillating said apparent position of the target at a controllably variable displacement amplitude.

References Cited
UNITED STATES PATENTS

| | | | |
|---|---|---|---|
| 2,570,305 | 10/1951 | Barney | 250—217 X |
| 2,943,207 | 6/1960 | Burlis et al. | 250—217 |
| 2,967,247 | 1/1961 | Turck | 250—203 |
| 3,012,465 | 12/1961 | Goldberg | 250—216 X |
| 3,033,987 | 5/1962 | Hotham | 250—217 |
| 3,188,477 | 6/1965 | Ault | 250—217 |
| 3,240,942 | 3/1966 | Birnbaum et al. | 250—203 |

WALTER STOLWEIN, *Primary Examiner.*